Oct. 12, 1965  F. W. SCHRAMM  3,212,025
SYSTEM FOR CALIBRATING OSCILLATOR SCALES
Filed April 6, 1961  2 Sheets-Sheet 1

INVENTOR
F. W. SCHRAMM
By a J Nugent
ATTORNEY

Oct. 12, 1965  F. W. SCHRAMM  3,212,025
SYSTEM FOR CALIBRATING OSCILLATOR SCALES
Filed April 6, 1961  2 Sheets-Sheet 2

INVENTOR
F. W. SCHRAMM
BY A J Nugent
ATTORNEY

United States Patent Office 3,212,025
Patented Oct. 12, 1965

3,212,025
SYSTEM FOR CALIBRATING OSCILLATOR SCALES
Fred W. Schramm, Fanwood, N.J., assignor to Western Electric Company, Incorporated, a corporation of New York
Filed Apr. 6, 1961, Ser. No. 101,251
10 Claims. (Cl. 331—44)

This invention relates to apparatus for automatically calibrating the scales of various types of electrical oscillators as, for example, dial type heterodyne oscillators.

In U.S. Patent 2,275,977, issued March 10, 1942, to W. J. Means et al., and U.S. Patent 2,508,547, issued May 23, 1950, to T. Slonczewski, there are disclosed systems for the automatic calibration of test oscillators by comparison with a frequency standard, wherein a variable speed electric motor and variable speed motion picture printing apparatus are employed.

The present invention improves over such systems by eliminating the time lag effects of the inertial forces which are attendant the operation of such variable speed mechanisms, thus improving the over-all accuracy of the calibration process. In addition, the present invention reduces the over-all size and complexity of the system, thus providing simpler and more economical production, operation, and maintenance thereof.

The principal object of the present invention is, therefore, to provide a novel arrangement of apparatus whereby the automatic frequency calibration of an oscillator is more accurately and rapidly achieved.

The invention generally comprises an apparatus wherein the blank scale of a variable frequency oscillator is affixed thereto and driven at a substantially constant speed through a predetermined range, thus resulting in the generation by the oscillator of a predetermined range of frequencies. Means responsive to the frequencies thus generated are employed to intermittently advance a master scale, upon which are linearly arranged the frequency scale markings, to a series of successive positions, in at least some of which at least one of the frequency scale markings on the master scale is susceptible to reproduction on the blank scale. The reproduction of the scale marking on the blank scale is effected by photographic means, the operation of which is also responsive to the generated frequencies and possible only when the master scale has assumed a stationary position and one of the scale markings thereon is susceptible to reproduction on the blank scale.

The invention is hereafter described in connection with the calibration of the 0–15 kc. scale of a Western Electric 19C dial type oscillator. However, the same apparatus can be employed in the calibration of the 0–250 cycle scale of the 19C dial type oscillator, or in the calibration of other oscillators such as those which employ film scale indicating means. The application of the system to such other oscillators would require only the proper selection of standard frequencies and peaked amplifiers, and the provision of suitable negative master scales.

The invention may be more fully understood by reference to the accompanying drawings, wherein.

Figure 1:
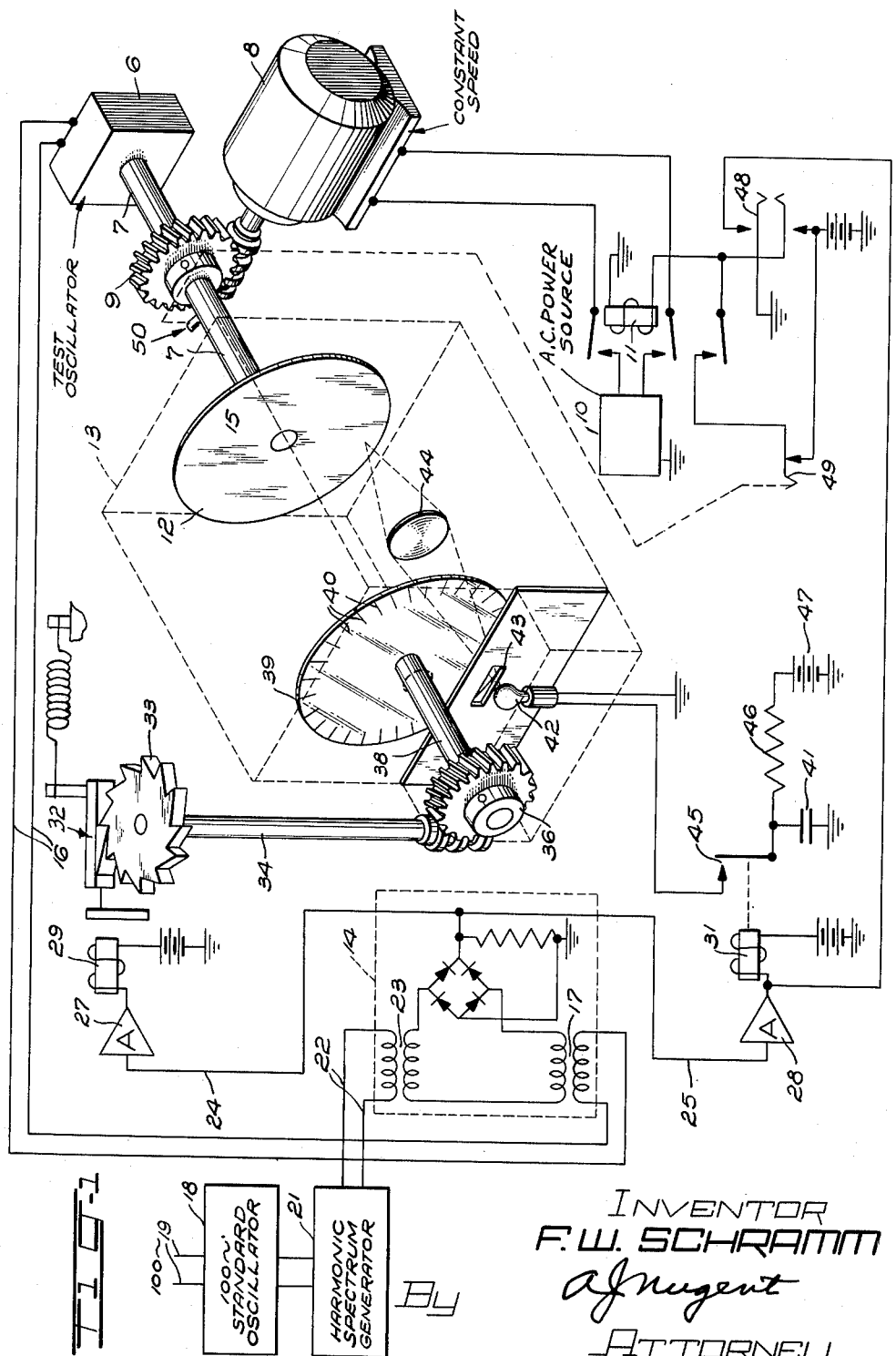
FIG. 1 is a perspective view of the calibrating mechanism shown in conjunction with the electrical circuits which complete the system.

Referring now to FIG. 1, the Western Electric 19C dial type heterodyne oscillator under test is indicated at 6. The frequency determining element, not shown, of this oscillator is a condenser, the capacity of which is varied by rotation of the condenser plate and controlled by the rotation of dial shaft 7, which shaft is driven, during a calibration operation, at constant speed by a reduction geared synchronous motor 8, and a worm wheel 9 connected therebetween. The synchronous motor 8 is supplied from a convenient power source 10 of constant frequency on operation of relay 11.

The sensitized dial plate 12, comprising an actinic surface 15 on which the frequency scale markings are to be printed, is connected directly to the end of dial shaft 7 and mounted within one end of camera chamber 13. Proper positioning of the dial plate relative to the shaft may be assured by suitably indexing the said plate on the shaft at the 0 frequency point. Rotation of the dial plate will thus function to change the output frequency of oscillator 6 in the above-described manner.

The output of oscillator 6 is applied to a modulator circuit 14 by means of conductors 16 connected to transformer 17.

A 100 cycle standard oscillator 18, synchronized by the 100 cycle standard frequency on conductors 19, is connected to a harmonic spectrum generator 21, the output of which harmonic spectrum generator consists of all harmonics of 100 cycles up to and beyond 15 kc., and all of equal amplitudes. These harmonics are impressed upon the modulator circuit 14 by conductors 22 connected to transformer 23.

Figure 2:
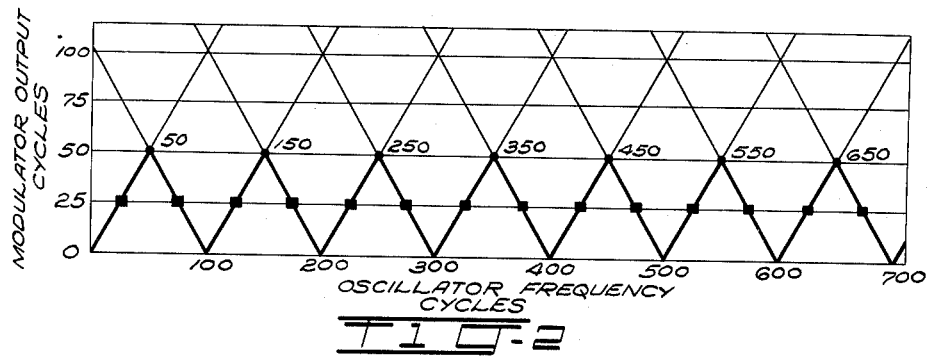
FIG. 2 is a graph representing modulator beat frequency output at various oscillator frequencies.

As the sensitized dial plate 12 and dial shaft 7 of the oscillator 6 are slowly turned by motor 8, the oscillator frequency rises, and the output of modulator 14 consists of a beat with each harmonic starting at a high value, falling to zero and rising again to a high value as shown in FIG. 2.

The pertinent parts of these beat frequencies are those shown in heavy lines in FIG. 2 and indicate the portion of the modulator output which rises from 0 to 50 cycles, falls to 0 cycles and then repeats.

Figure 3:
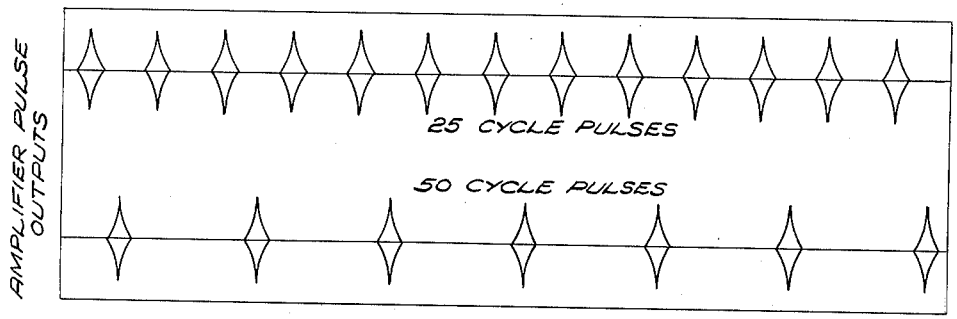
FIG. 3 depicts peaked amplifier pulse outputs.

The output of the modulator 14 is fed to two sharply peaked amplifiers 27 and 28 through respective conductors 24 and 25. Peaked amplifier 27 is tuned to a frequency of 25 cycles, while peaked amplifier 28 is tuned to a frequency of 50 cycles. Accordingly, as the frequency of the test oscillator 6 changes and the beat frequencies of FIG. 2 are fed to the peaked amplifier 27 and 28 from the modulator 14, the outputs of the peaked amplifiers will take the form of the sharp pulses depicted in FIG. 3, with the 25 cycle pulses emanating from peaked amplifier 27 and the 50 cycle pulses from peaked amplifier 28. The operation of this portion of the system is believed made clearer by further reference to FIG. 2 wherein the small squares on the beat frequency graph indicate the 25 cycle points to which peaked amplifier 27 is responsive and the small circles on the graph indicate the 50 cycle points to which peaked amplifier 28 is responsive.

The 25 cycle pulses of peaked amplifier 27 function to operate relay 29 once for the passage therethrough of each such pulse, while the same is true for the effect of the 50 cycle pulses from peaked amplifier 28 upon relay 31. Since there are twice as many 25 cycle points as there are 50 cycle points on the beat frequency curve of FIG. 2 there will, of course, be twice as many 25 cycle pulses emanating from peaked amplifier 27 as there will be 50 cycle pulses from peaked amplifier 28. Thus, relay 29 will operate twice as often as relay 31.

The armature of relay 29 is connected to a spring-driven pawl 32 which operates on release by the said relay to drive ratchet wheel 33 at a rate of one notch per relay release. Such rotation of the ratchet wheel 33 causes corresponding and proportional rotation of shaft 38 by means of shaft 34 and worm wheel 36 connected therebetween.

Mounted upon shaft 38 and within the other end of camera chamber 13 is the negative master dial 39 upon which are linearly arranged the frequency scale markings (shown generally at 40) at 100 cycle intervals from 0 to 15 kc. The present arrangement calls for two operations of the pawl 32 to rotate the negative master dial through one scale division, i.e., 100 cycles, although other ratio arrangements could obviously be satisfactorily employed. It is, of course, one of the primary purposes of this invention to print the markings of such frequency scale divisions at accurate locations upon sensitized dial plate 12 in the manner more fully set forth herein below.

Turning again to relay 31 it is seen that each operation of this relay in the manner heretofore described functions to close a discharge path through switch 45 from capacitor 41 through a photo-flash lamp 42 to ground, thus causing such lamp to flash for a fraction of a second. Upon discharge of capacitor 41, the voltage thereat is of very low value because of the high resistance of resistor 46 connected in series with battery 47. When the relay 31 releases, the capacitor begins to charge through resistor 46 and the capacitor voltage then rises to approximately battery voltage before the next operation of relay 31.

Found in the wall of camera chamber 13 adjacent the flash lamp is a slit 43, which functions to admit the light from the momentary flashing of said lamp into the camera chamber. Within the camera chamber and in line with such slit is also located lens 44 at a point between negative master dial 39 and sensitized dial plate 12. Accordingly, it is seen that upon flashing of the lamp, light passes through slit 43 and negative master dial 39 and is focused by lens 44 upon the actinic surface 15 of the sensitized dial plate, thus imprinting on such dial plate the image of the negative master dial frequency scale marking then opposite the slit.

This process is continuously repeated until the entire set of scale markings on the negative master dial have been imprinted on the sensitized dial plate, with each two operations of relay 29 functioning to advance the negative master dial 100 cycles and each operation of relay 31 causing the photo-flash lamp to flash momentarily.

Thus, inaccuracies in proper positioning of the master dial which result from time lag occasioned by changing inertias in the heretofore employed variable speed mechanisms are wholly eliminated, since the negative master dial is stationary and properly positioned during the momentary flashing of the photo-flash lamp. This staggered and non-concurrent relationship between the operation of the negative master dial and the flashing of the photo-flash lamp is made clear by reference to FIG. 2 wherein the 25 cycle, negative master dial operating points on the beat frequency graph—as indicated by the small squares—are clearly seen to be non-coincident in point of time with the 50 cycle, photo-flash lamp operation points—as indicated by the small circles.

Figure 4:
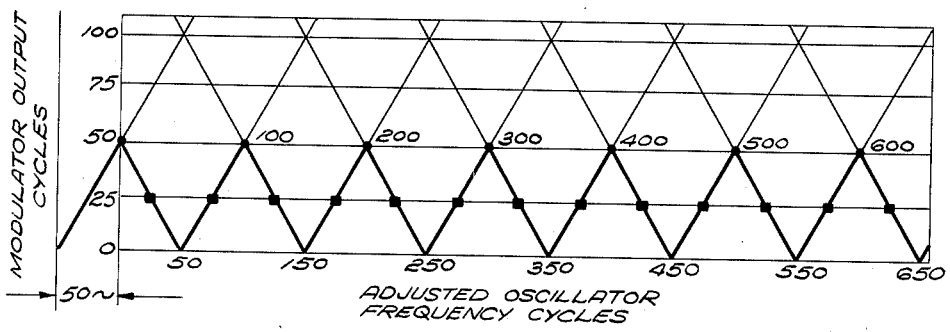
FIG. 4 is a graph representing modulator beat frequency output at adjusted oscillator frequencies.

FIG. 2 also reveals, however, that the photo-flash lamp operating points would occur in point of time coincident with generation by the heterodyne oscillator 6 of 50, 150, 250, etc., cycles, at which times the 100 cycle scale markings on the negative master dial would not be properly located opposite the slit 43. Thus, and in order to effect the proper positioning of such scale markings at the correct time, the fixed oscillator of the heterodyne oscillator 6 must be offset 50 cycles so that the heterodyne oscillator generates frequencies which are multiples of 100 cycles at the points in time when the beat frequency has a value of 50 cycles and the photoflash lamp is momentarily flashing. This frequency shift in the generated frequency of the heterodyne oscillator is easily arranged by temporarily bridging a small capacitor across the kc. capacitor in the heterodyne oscillator to lower the frequency of the fixed oscillator thereof immediately prior to commencement of the calibration run. The result of offsetting the generated frequency of the heterodyne oscillator in this manner is shown graphically in FIG. 4 wherein the 100 cycle oscillator frequency points are seen to be coincident with the 50, 150, 250, etc., cycle oscillator frequency points of FIG. 2. This assures the requisite coincidence in point of time between the 100, 200, 300, etc., cycle points of the oscillator frequency and the 50 cycle points of the beat frequency. As in FIG. 2, the functional 25 and 50 cycle points on the beat frequency graph are identified by small squares and small circles, respectively.

In order to print the 0 cycle line and designation on the sensitized dial plate, a contact is provided on the start key 48 to operate relay 31 once, thus flashing the photo-flash lamp 42 momentarily before the motor 8 has started.

The start key also operates relay 11 which locks up through the stop key 49 and remains in this position even after the start key has been released. When the full scale has been imprinted on the sensitized dial scale, the stop key 49 is automatically opened, thus breaking the lock-up circuit of relay 11 and stopping the motor. Such automatic actuation of the stop key at the proper time may be effected in any convenient manner and may comprise, for example, the utilization of an arm 50 attached to oscillator shaft 7 and functioning to open the stop key by abutment therewith (shown schematically in FIG. 1) when the shaft reaches a predetermined position following the printing of the last or 15 kc. mark on the sensitized dial plate.

Various changes and modifications may be made in the disclosed embodiments without departing from the spirit and scope of the invention.

What is claimed is:

1. In an apparatus for calibrating the blank scale of an oscillator by reproducing thereon the scale markings of a master scale and wherein the blank scale is movable to control the frequencies generated by the oscillator, the combination of means to move the blank scale through a predetermined range of generated frequency determining positions, means responsive to the generated frequencies to correspondingly advance the master scale to a series of successive stationary positions in at least some of which at least one of the scale markings on the master scale is susceptible to reproduction on the blank scale, and further means responsive to the generated frequencies and operative only when the master scale is stationary and the scale marking thereon is susceptible to reproduction on the blank scale to so reproduce the master scale marking.

2. Apparatus as in claim 1 wherein the means responsive to the generated frequencies comprise a peaked amplifier, a relay electrically connected thereto, a pawl and ratchet wheel mechanically connected to said relay and operable thereby, and shaft and gear means drivingly connecting said ratchet wheel to the master scale.

3. Apparatus as in claim 1 wherein the further means responsive to the generated frequencies comprise a peaked amplifier, a relay electrically connected thereto, illuminating means, and an electrical circuit operative upon activation by said relay to energize the illuminating means.

4. Apparatus as in claim 1 further including means to momentarily energize the illuminating means before movement of the blank scale and master scale have begun, thus reproducing the first of the scale markings on the blank scale.

5. Apparatus as in claim 1 wherein the means to move the blank scale through a predetermined range of frequency determining positions include a mechanism to automatically terminate the operation of the apparatus when the blank scale has reached the last of the predetermined generated frequency determining positions.

6. Apparatus for calibrating the blank scale of an oscillator comprising means affixing the blank scale to the oscillator control shaft so that rotation of the scale controls the frequencies generated by the oscillator, means to rotate the control shaft and blank scale at a substantially constant speed, a source of standard frequency, a harmonic spectrum generator connected thereto, a modulator circuit upon which are impressed the generated frequencies and the output of the harmonic spectrum generator, thus providing a beat frequency modulator output, a negative master dial with scale markings formed thereon, means responsive to modulator output frequencies of one value to intermittently advance the negative master dial to a series of successive positions, a camera chamber enclosing the blank scale and the negative master dial and having a slit formed therein, illuminating means located adjacent the exterior of the camera chamber in alignment with the said slit, means responsive to a second and non-concurrent modulator output frequency of different value to momentarily energize the illuminating means and operative only when said negative master dial is stationary and a scale marking thereon in alignment with the said slit to thereby imprint such scale marking on the blank scale.

7. Apparatus as in claim 6 wherein the blank scale comprises an actinic surface.

8. Apparatus for calibrating a light sensitive scale of an oscillator comprising:
 means for moving the light sensitive scale in accordance with the frequency of the oscillator,
 a movable master scale mounted in spaced relationship with the light sensitive scale and having markings thereon,
 means responsive to incremental frequency changes of the oscillator for moving the master scale intermittently to a series of positions, and
 optical means responsive to incremental frequency changes of the oscillator, nonconcurrent with the first named incremental frequency changes, for reproducing scale markings from the master scale on the light sensitive scale only in said positions during the rest intervals of the intermittent movement of the master scale.

9. An automatic calibration apparatus comprising:
 a signal source operative to generate a signal which varies in frequency throughout a predetermined frequency range,
 a rotatably mounted master scale,
 a pawl and ratchet unit connected to the rotatably mounted scale,
 a sharply peaked amplifier connected to said signal source and tuned to frequency increments therefrom of a first value,
 a relay electrically connected to the sharply peaked amplifier and mechanically connected to the pawl and ratchet unit wherein frequency increments of the first value causes the pawl and ratchet unit to intermittently advance the rotatably mounted scale to a series of successive positions,
 a mechanism connected to said signal source and operable to coact with said master scale to calibrate a scale, and
 means responsive to nonconcurrent frequency increments of a second value from the signal source to operate the mechanism.

10. An automatic calibration apparatus which comprises:
 a signal source operative to generate a signal which varies in frequency throughout a predetermined frequency range,
 a master scale having a plurality of markings thereon,
 an illuminating means mounted in spaced relationship with said master scale,
 means responsive to frequency increments of a first value from the signal source to intermittently advance the master scale to a series of successive positions,
 a sharply peaked amplifier tuned to nonconcurrent signal source frequency increments of a second value, and
 a relay connected to said amplifier which is, upon activation thereby, operative to momentarily energize said illuminating means which causes the markings on the master scale to be reprodudced on a scale to be calibrated.

References Cited by the Examiner
UNITED STATES PATENTS

| | | | |
|---|---|---|---|
| 2,629,829 | 2/53 | Daly | 331—44 |
| 2,762,922 | 9/56 | Lax | 331—13 |
| 2,769,091 | 10/56 | Hansel | 331—44 |
| 3,001,131 | 9/61 | Oliver | 324—74 |

ROY LAKE, *Primary Examiner.*

LLOYD McCOLLUM, *Examiner.*